United States Patent
Alcalde

(10) Patent No.: US 9,664,775 B2
(45) Date of Patent: May 30, 2017

(54) RADAR SYSTEM AND METHOD FOR VIRTUAL ANTENNA SIGNALS

(71) Applicant: DELPHI TECHNOLOGIES, INC., Troy, MI (US)

(72) Inventor: Carlos A. Alcalde, Beverly Hills, CA (US)

(73) Assignee: Delphi Technologies, Inc., Troy, MI (US)

( * ) Notice: Subject to any disclaimer, the term of this patent is extended or adjusted under 35 U.S.C. 154(b) by 383 days.

(21) Appl. No.: 14/499,990

(22) Filed: Sep. 29, 2014

(65) Prior Publication Data

US 2016/0091595 A1  Mar. 31, 2016

(51) Int. Cl.
| | |
|---|---|
| *G01S 7/02* | (2006.01) |
| *G01S 13/44* | (2006.01) |
| *G01S 13/93* | (2006.01) |

(52) U.S. Cl.
CPC ............ *G01S 7/02* (2013.01); *G01S 13/4454* (2013.01); *G01S 13/931* (2013.01)

(58) Field of Classification Search
CPC ....... G01S 13/4454; G01S 13/931; G01S 7/02
USPC ....................................................... 342/175
See application file for complete search history.

(56) References Cited

U.S. PATENT DOCUMENTS

| | | |
|---|---|---|
| 2004/0104844 A1 | 6/2004 | Rooyen et al. |
| 2010/0075618 A1 | 3/2010 | Isaji |
| 2012/0223852 A1* | 9/2012 | Gross .................... G01S 13/931 342/70 |
| 2014/0159945 A1 | 6/2014 | Chung et al. |

OTHER PUBLICATIONS

Piya Pal, et al.: "Non uniform linear arrays for improved identifiability in cumulant based DOA Estimation", Signals, Systems and Computers (Asilomar), 2011 Conference Record of the Forty Fifth Asilomar Conference on, IEEE, Nov. 6, 2011 (Nov. 6, 2011), pp. 608-612, XP032172175, DOI: 10.1109/ACSSC2011.6190074 ISBN: 978-1-4673-0321-7 * paragraph [0004]; figure 1 *.

* cited by examiner

*Primary Examiner* — Timothy A Brainard
(74) *Attorney, Agent, or Firm* — Lawrence D. Hazelton

(57) ABSTRACT

A radar system includes a radar antenna and a controller. The antenna includes a reference element, an alpha element spaced apart from the reference element by one half-wavelength of the reflected signal, and a beta element spaced apart from the reference element by an even number of half-wavelengths of the reflected signal. The controller is configured to determine an alpha phase difference between detected signals from the reference element and the alpha element, determine a beta phase difference between detected signals from the reference element and the beta element, and determine a first virtual phase difference that corresponds to the reflected signal expected to be detected by a first virtual element located halfway between the reference element and the beta element. The first virtual phase difference is based on the beta phase difference divided by two.

17 Claims, 2 Drawing Sheets

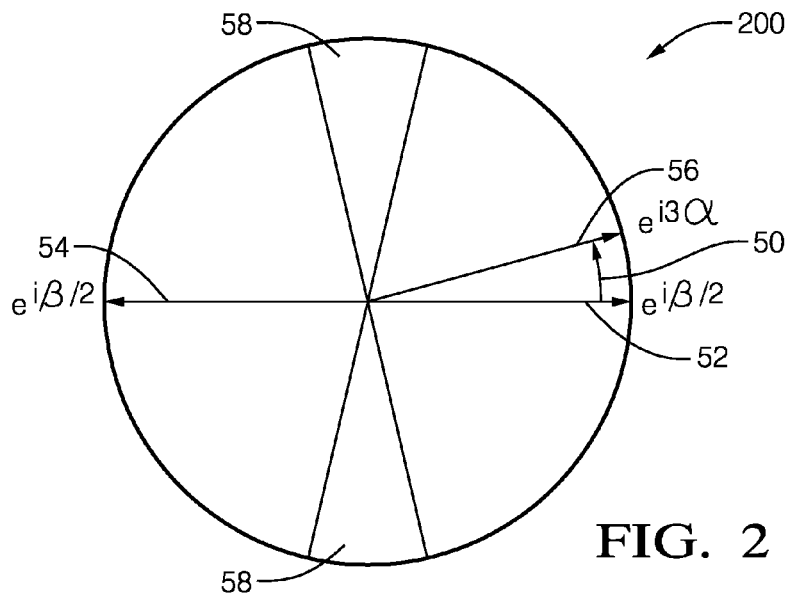
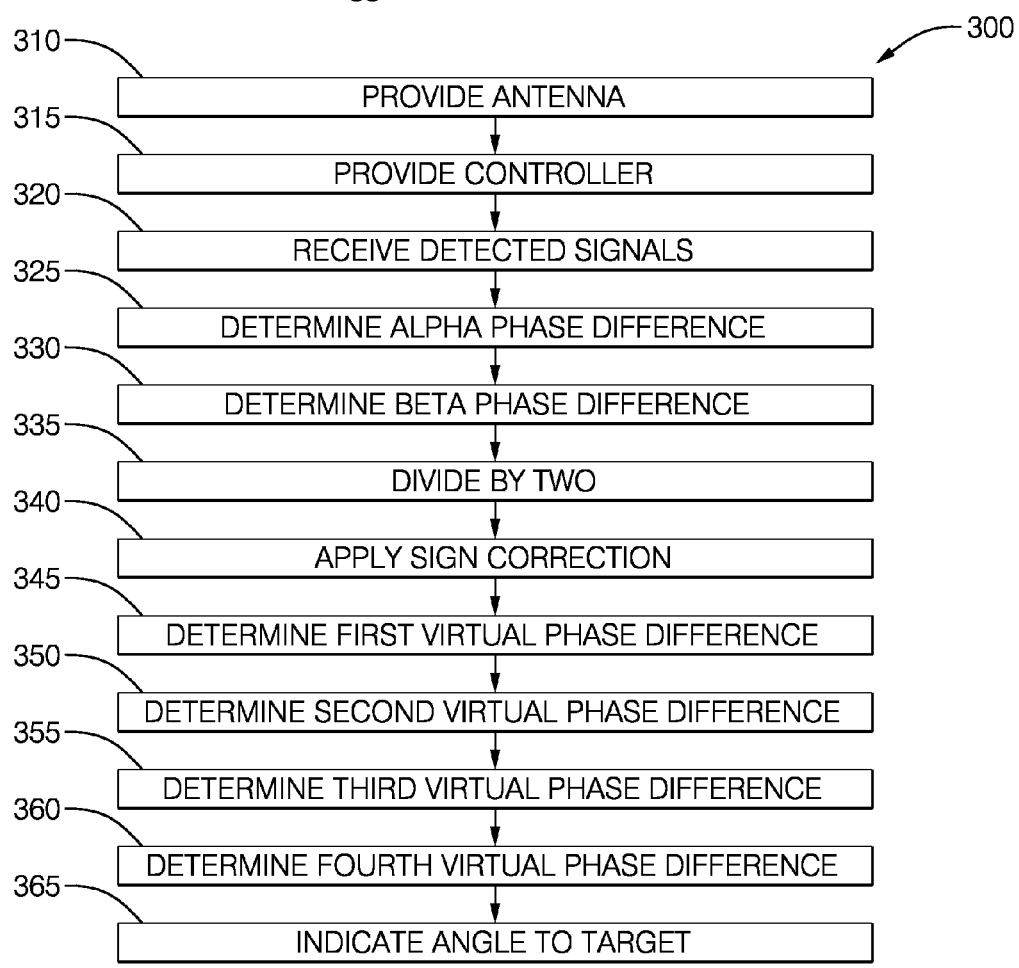

… (1) …

RADAR SYSTEM AND METHOD FOR VIRTUAL ANTENNA SIGNALS

TECHNICAL FIELD OF INVENTION

This disclosure generally relates to radar systems with antenna arrays, and more particularly relates to beam-forming using synthesized signals of virtual antenna elements from signals received from actual antenna elements.

BACKGROUND OF INVENTION

Radar receive-antenna arrays with two closely spaced elements (e.g. spaced apart one half-wavelength) and one widely spaced element (e.g. spaced apart multiple wavelengths) have been proposed. The reflected signals detected by each antenna element may be used to synthesize or determine a virtual phase difference that corresponds to the reflected signal expected to be detected by a virtual element located between the two closely spaced antenna elements and the widely spaced antenna element. Phase comparison mono-pulse (PCMP) uses a phase difference of detected signals from the narrow spaced antenna elements to estimate a virtual phase difference for a virtual element based on the separation or spacing of the virtual element relative to the narrow spaced antenna elements. Any error in measuring the phase difference of detected signals from the narrow spaced antenna elements is compounded when that error is applied to the virtual phase difference.

SUMMARY OF THE INVENTION

In accordance with one embodiment, a radar system configured to process a reflected signal detected by a radar antenna is provided. The system includes a radar antenna and a controller. The antenna includes a reference element, an alpha element spaced apart from the reference element by one half-wavelength of the reflected signal, and a beta element spaced apart from the reference element by an even number of half-wavelengths of the reflected signal. The controller is configured to receive detected signals from the reference element, the alpha element, and the beta element. The controller is also configured to determine an alpha phase difference between the detected signals from the reference element and the alpha element, determine a beta phase difference between the detected signals from the reference element and the beta element. The controller is also configured to determine a first virtual phase difference that corresponds to the reflected signal expected to be detected by a first virtual element located halfway between the reference element and the beta element. The first virtual phase difference is based on the beta phase difference divided by two.

In another embodiment, a controller for a radar system configured to process a reflected signal detected by a radar antenna is provided. The antenna includes a reference element, an alpha element spaced apart from the reference element by one half-wavelength of the reflected signal, and a beta element spaced apart from the reference element by an even number of half-wavelengths of the reflected signal. The controller is configured to receive detected signals from the reference element, the alpha element, and the beta element. The controller is also configured to determine an alpha phase difference between the detected signals from the reference element and the alpha element, determine a beta phase difference between the detected signals from the reference element and the beta element. The controller is also configured to determine a first virtual phase difference that corresponds to the reflected signal expected to be detected by a first virtual element located halfway between the reference element and the beta element. The first virtual phase difference is based on the beta phase difference divided by two.

In yet another embodiment, a method of processing a reflected signal detected by a radar antenna is provided. The method includes receiving detected signals from a radar antenna. The antenna includes a reference element, an alpha element spaced apart from the reference element by one half-wavelength of the reflected signal, and a beta element spaced apart from the reference element by an even number of half-wavelengths of the reflected signal. The method also includes determining an alpha phase difference between the detected signals from the reference element and the alpha element. The method also includes determining a beta phase difference between the detected signals from the reference element and the beta element. The method also includes determining a first virtual phase difference that corresponds to the reflected signal expected to be detected by a first virtual element located halfway between the reference element and the beta element. The first virtual phase difference is based on the beta phase difference divided by two.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIG. 2 is a graphical illustration of signals present in the system of FIG. 1 in accordance with one embodiment; and FIG. 3 is a flowchart of a method performed by the system of FIG. 1 in accordance with one embodiment.

DETAILED DESCRIPTION

Figure 1:
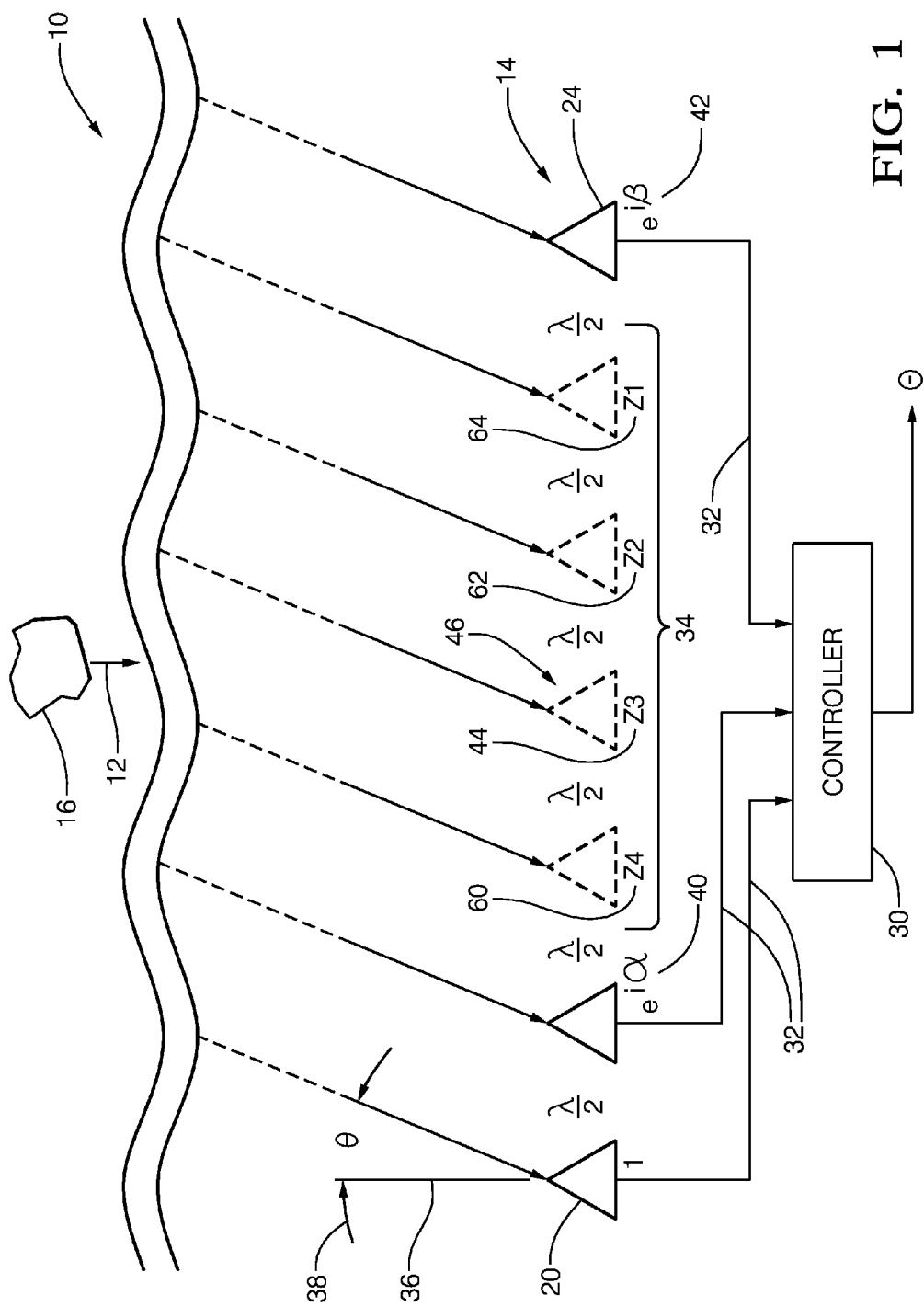
FIG. 1 is diagram of a radar system in accordance with one embodiment.

FIG. 1 illustrates a non-limiting example of a radar system, hereafter referred to as the system 10. The system 10 is generally configured to process a reflected signal 12 detected by a radar antenna, hereafter the antenna 14. While not shown, it will be understood by those in the art that the reflected signal 12 is the result of a target 16 reflecting a transmitted signal (not show) emitted by a transmit antenna (not shown) that may be part of the system 10, as will be recognized by those in the art. A suitable frequency for the reflected signal 12 is $76.5*10^9$ Hertz (76.5 GHz), so an example wavelength of 2.6 millimeters (mm) will be used for the discussion that follows. The examples presented herein are non-limiting as those skilled in the art will recognize that dimensions of the antenna 14 can be scaled or otherwise altered to adapt the antenna 14 for operation at a different radar frequency.

The antenna 14 includes a reference element 20, and an alpha element 22 spaced apart from the reference element 20 by one half-wavelength of the reflected signal 12, e.g. 1.3 mm, for detecting the reflected signal 12. The antenna 14 also includes a beta element 24 spaced apart from the reference element 20 by an even number of half-wavelengths of the reflected signal, e.g. six half-wavelengths or 7.8 mm, for detecting the reflected signal 12. The elements (20, 22, 24) that form the antenna 14 may be microstrip antennas, and may be arranged on a substrate (not shown). Accordingly, the view of the antenna 14 shown in FIG. 1 may be interpreted to be an end view of the antenna 14 looking at the end of each of the elements. Each element may be a string or linear array of patches formed of half-ounce copper foil on a 380 micrometer (μm) thick substrate such as RO5880 substrate from Rogers Corporation of Rogers, Conn. A suitable overall length of the elements is forty-eight millimeters (48 mm). The patches preferably have a width of 1394 μm and a height of 1284 μm. The patch pitch is preferably one guided wavelength of the radar signal, e.g. 2560 μm, and the microstrips interconnecting each of the patches are preferably 503 μm wide.

The system 10 includes a controller 30 configured to receive detected signals 32 from the reference element 20, the alpha element 22, and the beta element 24. In order to determine a direction to the target 16, the system may determine an angle 38 (θ) relative to a bore site 36 of the antenna 14. Those in the art will recognize that the bore site 36 is typically perpendicular to the plane of the substrate upon which the elements of the antenna 14 reside. The controller may also be configured to output a transmit signal (not shown) to the transmit antenna for emitting the transmitted signal that caused the reflected signal 12.

The controller 30 may be configured to determine an alpha phase difference 40 ($e^{i\alpha}$) measured between the detected signals 32 from the reference element 20 and the alpha element 22. The phase of the detected signal from the reference element 20 is arbitrarily assigned a value of one (1) or unity so any phase differences can be readily expressed as shown. Similarly, the controller 30 may be configured to determine a beta phase difference 42 ($e^{i\beta}$) between the detected signals from the reference element 20 and the beta element 24.

It was observed that attempts to use receive antennas with only two elements separated by one half-wavelength and determine the angle 38 based solely on the alpha phase difference 40 were susceptible to noise. It was then proposed to add a third element (the beta element 24) spaced well apart from the pair of half-wavelength spaced elements in an attempt to reduce the noise effects. It was recognized that the detected signals 32 could be used to synthesize or estimate signals from virtual elements 34 at locations between the alpha element 22 and the beta element 24. It should be understood that the virtual elements 34 are not actual elements of the antenna 14, as is the case for the reference element 20, the alpha element 22, and the beta element 24. The synthesized signals can be used to determine or estimate a virtual phase difference (Z1, Z2, Z3, Z4) for each of the virtual elements 34 illustrated.

While the non-limiting example shown in FIG. 1 shows four of the virtual elements 34 as a result of the beta element 24 being spaced six half-wavelengths apart from the reference element 20, it is recognized that the beta element 24 could be spaced further apart from the reference element 20. Accordingly, with wider spacing there could be more virtual elements illustrated and more virtual phase differences determined. For example, the beta element 24 could be spaced apart from the reference element by eight half-wavelengths, which would give rise to six virtual elements.

It was proposed that the virtual phase differences could be calculated by progressively applying the alpha phase difference 40 so that the virtual phase difference Z4 would be the alpha phase difference times two (e.g. $e^{i2\alpha}$), the virtual phase difference Z3 would be the alpha phase difference times three (e.g. $e^{i3\alpha}$), and so on. However, because of the previously mentioned noise problem with the alpha phase difference 40 ($e^{i\alpha}$), an alternative way to estimate a phase difference that reduced the noise effects was desired.

In recognition of the decreased noise effect available from the beta element 24, the controller is configured to determine a first virtual phase difference 44 that corresponds to the reflected signal expected to be detected by a first virtual element 46 (Z3) located halfway between the reference element 20 and the beta element 24, where the first virtual phase difference 44 is based on (i.e. equal to) the beta phase difference 42 ($e^{i\beta}$) divided by two ($e^{i\beta/2}$). The first virtual phase difference 44 can be expressed in complex terms as $e^{i\beta/2}$. This same expression would be used for any instance where the beta element 24 is spaced apart from the reference element 20 by an even number of wavelengths. That is, the first virtual element 46 is always the virtual element located halfway between the reference element 20 and the beta element 24, so the first virtual phase difference 44 can always be expressed as $e^{i\beta/2}$. This stands in contrast to expressing the phase difference for the middle virtual element as $e^{i3\alpha}$ if the alpha progression is used when the beta element 24 is spaced apart from the reference element 20 by six half-wavelengths, or as $e^{i4\alpha}$ if the alpha progression is used when the beta element 24 is spaced apart from the reference element 20 by eight half-wavelengths.

It should be recognized that the integer number of $2\pi$ radians in the actual phase difference is unknown. That is, the beta phase difference 42 is more accurately expressed as $e^{i(n2\pi+\beta)}$. That is, since the value of 'n' is unknown, the convention is that the beta phase difference 42 is expressed as $e^{i\beta}$. However, if the beta phase difference 42 is divided by two, and 'n' is unknown, then the first virtual phase difference has a sign ambiguity and so is more properly expressed as $+/-e^{i\beta/2}$. In order to fully realize the benefit of determining the first virtual phase difference 44 based on based on the beta phase difference 42 instead of base on the more noise susceptible alpha phase progression method, it is advantageous to resolve this sign ambiguity.

FIG. 2 illustrates a graph 200 of an example of this sign ambiguity, and how the ambiguity can be resolved. Phasors 52, 54 represent the first virtual phase difference 44 based on beta phase difference 42 divided by two, e.g. $+e^{i\beta/2}$ and $-e^{i\beta/2}$, where for this example the value of β is zero. Phasor 56 represents the phase difference for the first virtual element 46 determined using the progression of the alpha phase difference, e.g. $e^{i3\alpha}$. By determining which of the beta phase difference 42 divided by two phasors (the phasors 52, 54) is closer to the alpha phase difference progression ($e^{i3\alpha}$), i.e. has a phase error 50 less than $\pi/2$, the sign ambiguity can be resolved. That is, the system 10, or more specifically the controller 30, is advantageously configured to determine the first virtual phase difference 44 by applying a sign correction to the beta phase difference 42 divided by two ($+/-e^{i\beta/2}$), where the sign correction is based on a comparison (e.g. calculating the phase error 50) of the beta phase difference divided by two ($+e^{i\beta/2}$ and $-e^{i\beta/2}$) to the alpha phase difference multiplied by the number of half-wavelengths that the first virtual element 46 is spaced apart from the reference element 20, three half-wavelengths ($e^{i3\alpha}$) for the example antenna illustrated in FIG. 1.

Since a virtual phase difference based on the alpha phase difference 40 (e.g. the phasor 56) is known to be noisy, it may be advantageous to designate a guard band 58 on the phasor diagram of FIG. 2 that indicates an area relative to the phasors 52, 54 where the presence of the phasor 56 would cause the determination of the sign correction to be uncertain and therefore blocked. It should be understood that the location of the guard band 58 is relatively constant with regard to the phasors 52, 54. For example, if the phasors 52, 54 rotated to some other orientation because the value of β was not zero, the guard band 58 would rotate about the same amount.

Just as determining or estimating the first virtual phase difference 44 using the beta phase difference 42 reduces noise, the noise associated with determining virtual phase differences of the other virtual elements (e.g. Z4, Z2, Z1) can also be reduced by using the beta phase difference 42 to determine the virtual phase differences of the other virtual elements instead of relying only on an alpha phase progression.

Accordingly, the controller 30 may be further configured to determine a second virtual phase difference 60 (Z4) that corresponds to the reflected signal expected to be detected by a second virtual element spaced apart from the reference element by two-half-wavelengths of the reflected signal 12. The second virtual phase difference may be determined by calculating or determining a difference between the alpha phase difference 40 and the first virtual phase difference 44, e.g. $Z4=Z3/e^{i\alpha}$. While the alpha phase difference 40 is used to determine the first virtual phase difference 44, the noise effects are reduced when compared to the alternative of using the alpha phase progression ($e^{i2\alpha}$) to determine the second virtual phase difference 60.

The controller 30 may also be further configured to determine a third virtual phase difference 62 (Z2) that corresponds to the reflected signal expected to be detected by a third virtual element spaced apart from the reference element by four-half-wavelengths of the reflected signal 12. The third virtual phase difference 62 may be determined by calculating or determining a sum of the alpha phase difference 40 and the first virtual phase difference 44, e.g. $Z4=Z3*e^{i\alpha}$.

The controller 30 may also be further configured to determine a fourth virtual phase difference 64 (Z1) that corresponds to the reflected signal expected to be detected by a fourth virtual element spaced apart from the reference element by five-half-wavelengths of the reflected signal 12. The fourth virtual phase difference 64 may be determined by calculating or determining a difference between the alpha phase difference 40 and the beta phase difference 42, e.g. $Z1=e^{i\beta}/e^{i\alpha}$.

FIG. 3 illustrates a method 300 of processing the reflected signal 12 detected by a radar antenna (the antenna 14), said method comprising:

Step 310, PROVIDE ANTENNA, may include fabricating the antenna 14 using known photo-etching techniques to define the reference element 20, the alpha element 22 spaced apart from the reference element 20 by one half-wavelength of the reflected signal 12, and the beta element 24 spaced apart from the reference element 20 by an even number of half-wavelengths of the reflected signal 12. Step 310 may also include mounting the antenna 14 in a housing (not shown) and/or on a vehicle (not shown).

Step 315, PROVIDE CONTROLLER, may include mounting various known electronic components onto a circuit board, as will be recognized by those in the art. The controller 30 may include a processor such as a microprocessor or other control circuitry such as analog and/or digital control circuitry including an application specific integrated circuit (ASIC) for processing data as should be evident to those in the art. The controller 30 may include memory, including non-volatile memory, such as electrically erasable programmable read-only memory (EEPROM) for storing one or more routines, thresholds and captured data. The one or more routines may be executed by the processor to perform steps to determine the angle 38 to the target 16 as described herein.

Step 320, RECEIVE DETECTED SIGNALS, may include the controller 30 receiving the detected signals 32 from the antenna 14.

Step 325, DETERMINE ALPHA PHASE DIFFERENCE, may include determining an alpha phase difference between the detected signals from the reference element and the alpha element Step 330, DETERMINE BETA PHASE DIFFERENCE, may include the controller 30 determining a beta phase difference between the detected signals from the reference element and the beta element Steps 335-345 cooperate to determine a first virtual phase difference 44 (Z3) that corresponds to the reflected signal expected to be detected by a first virtual element 46 located halfway between the reference element 20 and the beta element 24. The first virtual phase difference 44 is equal to the beta phase difference 42 divided by two, e.g. $Z3=e^{i\beta/2}$.

Step 335, DIVIDE BY TWO, may include a microprocessor in the controller 30 performing the necessary steps to divide the value of the beta phase difference 42 in half.

Step 340, APPLY SIGN CORRECTION, may include the controller 30 applying a sign correction to the beta phase difference divided by two ($e^{i\beta/2}$). The sign correction is based on a comparison of the beta phase difference divided by two ($e^{i\beta/2}$) to the alpha phase difference multiplied by the number of half-wavelengths that the first virtual element is spaced apart from the reference element, which is $e^{i3\alpha}$ for the antenna 14 shown in FIG. 1

Step 345, DETERMINE FIRST VIRTUAL PHASE DIFFERENCE, may, after performing steps 335 and 340, optionally include determining if the phasor 56 (FIG. 2) is located inside of the guard band 58. If true, then there is an indication that the phasor 56, which is based on an alpha phase progression, has too much noise to be reliably used to determine the sign correction.

Step 350, DETERMINE SECOND VIRTUAL PHASE DIFFERENCE, may include the controller 30 determining a second virtual phase difference 60 (Z4) that corresponds to the reflected signal expected to be detected by a second virtual element spaced apart from the reference element 20 by two-half-wavelengths of the reflected signal 12. In this example, the second virtual phase difference 60 is equal to a difference between the alpha phase difference 40 and the first virtual phase difference 44, e.g. $Z4=Z3/e^{i\alpha}$.

Step 355, DETERMINE THIRD VIRTUAL PHASE DIFFERENCE, may include the controller 30 determining a third virtual phase difference 62 (Z2) that corresponds to the reflected signal expected to be detected by a third virtual element spaced apart from the reference element 20 by four-half-wavelengths of the reflected signal 12. In this example the third virtual phase difference 62 is equal to a sum of the alpha phase difference 40 and the first virtual phase difference 44, e.g. $Z2=Z3*e^{i\alpha}$.

Step 360, DETERMINE FOURTH VIRTUAL PHASE DIFFERENCE, may include the controller 30 determining a fourth virtual phase difference 64 (Z1) that corresponds to the reflected signal expected to be detected by a fourth virtual element spaced apart from the reference element by five-half-wavelengths of the reflected signal 12. In this example the fourth virtual phase difference 64 is equal to a difference between the alpha phase difference 40 and the beta phase difference 42, e.g. $Z1=e^{i\beta}/e^{i\alpha}$.

Step 365, INDICATE ANGLE TO TARGET, may include the controller 30 combining or processing the various phase differences (40, 42, 44, 60, 62, 64) to determine the angle 38, and outputting that value (Θ) to another system or device on the vehicle.

While this invention has been described in terms of the preferred embodiments thereof, it is not intended to be so limited, but rather only to the extent set forth in the claims that follow.

I claim:

1. A radar system configured to process a reflected signal detected by a radar antenna, said system comprising:
a radar antenna, wherein the antenna includes a reference element, an alpha element spaced apart from the reference element by one half-wavelength of the reflected signal, and a beta element spaced apart from the reference element by an even number of half-wavelengths of the reflected signal; and
a controller configured to
receive detected signals from the reference element, the alpha element, and the beta element,
determine an alpha phase difference between the detected signals from the reference element and the alpha element,
determine a beta phase difference between the detected signals from the reference element and the beta element, and
determine a first virtual phase difference that corresponds to the reflected signal expected to be detected by a first virtual element located halfway between the reference element and the beta element, wherein the first virtual phase difference is based on the beta phase difference divided by two.

2. The system in accordance with claim 1, wherein determining the first virtual phase difference includes applying a sign correction to the beta phase difference divided by two, wherein the sign correction is based on a comparison of the beta phase difference divided by two to the alpha phase difference multiplied by the number of half-wavelengths that the first virtual element is spaced apart from the reference element.

3. The system in accordance with claim 1, wherein the beta element is spaced apart from the reference element by six half-wavelengths of the reflected signal, whereby the first virtual element is spaced apart from the reference element by three half-wavelengths of the reflected signal.

4. The system in accordance with claim 3, wherein determining the first virtual phase difference includes applying a sign correction to the beta phase difference divided by two, wherein the sign correction is based on a comparison of the beta phase difference divided by two to the alpha phase difference times three.

5. The system in accordance with claim 3, wherein the controller is further configured to determine a second virtual phase difference that corresponds to the reflected signal expected to be detected by a second virtual element spaced apart from the reference element by two-half-wavelengths of the reflected signal, wherein the second virtual phase difference is based on a difference between the alpha phase difference and the first virtual phase difference.

6. The system in accordance with claim 5, wherein the controller is further configured to determine a third virtual phase difference that corresponds to the reflected signal expected to be detected by a third virtual element spaced apart from the reference element by four-half-wavelengths of the reflected signal, wherein the third virtual phase difference is based on a sum of the alpha phase difference and the first virtual phase difference.

7. The system in accordance with claim 6, wherein the controller is further configured to determine a fourth virtual phase difference that corresponds to the reflected signal expected to be detected by a fourth virtual element spaced apart from the reference element by five-half-wavelengths of the reflected signal, wherein the fourth virtual phase difference is based on a difference between the alpha phase difference and the beta phase difference.

8. A controller for a radar system configured to process a reflected signal detected by a radar antenna that includes a reference element, an alpha element spaced apart from the reference element by one half-wavelength of the reflected signal, and a beta element spaced apart from the reference element by an even number of half-wavelengths of the reflected signal, said controller configured to
receive detected signals from the reference element, the alpha element, and the beta element,
determine an alpha phase difference between the detected signals from the reference element and the alpha element,
determine a beta phase difference between the detected signals from the reference element and the beta element, and
determine a first virtual phase difference that corresponds to the reflected signal expected to be detected by a first virtual element located halfway between the reference element and the beta element, wherein the first virtual phase difference is based on the beta phase difference divided by two.

9. The system in accordance with claim 8, wherein determining the first virtual phase difference includes applying a sign correction to the beta phase difference divided by two, wherein the sign correction is based on a comparison of the beta phase difference divided by two to the alpha phase difference multiplied by the number of half-wavelengths that the first virtual element is spaced apart from the reference element.

10. The system in accordance with claim 8, wherein the beta element is spaced apart from the reference element by six half-wavelengths of the reflected signal, whereby the first virtual element is spaced apart from the reference element by three half-wavelengths of the reflected signal, wherein determining the first virtual phase difference includes applying a sign correction to the beta phase difference divided by two, wherein the sign correction is based on a comparison of the beta phase difference divided by two to the alpha phase difference times three.

11. A method of processing a reflected signal detected by a radar antenna, said method comprising:
receiving detected signals from a radar antenna, wherein the antenna includes a reference element, an alpha element spaced apart from the reference element by one half-wavelength of the reflected signal, and a beta element spaced apart from the reference element by an even number of half-wavelengths of the reflected signal;
determining an alpha phase difference between the detected signals from the reference element and the alpha element;
determining a beta phase difference between the detected signals from the reference element and the beta element; and
determining a first virtual phase difference that corresponds to the reflected signal expected to be detected by a first virtual element located halfway between the reference element and the beta element, wherein the first virtual phase difference is based on the beta phase difference divided by two.

12. The method in accordance with claim 11, wherein determining the first virtual phase difference includes applying a sign correction to the beta phase difference divided by two, wherein the sign correction is based on a comparison of the beta phase difference divided by two to the alpha phase difference multiplied by the number of half-wavelengths that the first virtual element is spaced apart from the reference element.

13. The method in accordance with claim 11, wherein the beta element is spaced apart from the reference element by six half-wavelengths of the reflected signal, whereby the first virtual element is spaced apart from the reference element by three half-wavelengths of the reflected signal.

14. The method in accordance with claim 13, wherein determining the first virtual phase difference includes applying a sign correction to the beta phase difference divided by two, wherein the sign correction is based on a comparison of the beta phase difference divided by two to the alpha phase difference times three.

15. The method in accordance with claim 13, wherein the method includes
determining a second virtual phase difference that corresponds to the reflected signal expected to be detected by a second virtual element spaced apart from the reference element by two-half-wavelengths of the reflected signal, wherein the second virtual phase difference is based on a difference between the alpha phase difference and the first virtual phase difference.

16. The method in accordance with claim 15, wherein the method includes
determining a third virtual phase difference that corresponds to the reflected signal expected to be detected by a third virtual element spaced apart from the reference element by four-half-wavelengths of the reflected signal, wherein the third virtual phase difference is based on a sum of the alpha phase difference and the first virtual phase difference.

17. The method in accordance with claim 16, wherein the method includes
determining a fourth virtual phase difference that corresponds to the reflected signal expected to be detected by a fourth virtual element spaced apart from the reference element by five-half-wavelengths of the reflected signal, wherein the fourth virtual phase difference is based on a difference between the alpha phase difference and the beta phase difference.

\* \* \* \* \*